US011387897B2

United States Patent
Chen et al.

(10) Patent No.: US 11,387,897 B2
(45) Date of Patent: Jul. 12, 2022

(54) PROTECTION METHOD AND SYSTEM IN FLEXIBLE BANDWIDTH OPTICAL NETWORKS WITH MULTI-CORE FIBER

(71) Applicant: SOOCHOW UNIVERSITY, Suzhou (CN)

(72) Inventors: Bowen Chen, Suzhou (CN); Qingcheng Zhu, Suzhou (CN); Gangxiang Shen, Suzhou (CN); Lian Xiang, Suzhou (CN); Mingyi Gao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/256,892

(22) PCT Filed: Jul. 24, 2020

(86) PCT No.: PCT/CN2020/103927
§ 371 (c)(1),
(2) Date: Dec. 29, 2020

(87) PCT Pub. No.: WO2021/088420
PCT Pub. Date: May 14, 2021

(65) Prior Publication Data
US 2021/0409112 A1 Dec. 30, 2021

(30) Foreign Application Priority Data
Nov. 5, 2019 (CN) .......................... 201911070780.6

(51) Int. Cl.
*H04B 10/032* (2013.01)

(52) U.S. Cl.
CPC .............................. *H04B 10/032* (2013.01)

(58) Field of Classification Search
None
See application file for complete search history.

(56) References Cited

U.S. PATENT DOCUMENTS

| 2004/0111651 A1* | 6/2004 | Mukherjee | .......... H04J 14/0241 714/4.1 |
| 2011/0229122 A1* | 9/2011 | Castoldi | .............. H04J 14/0284 398/2 |

(Continued)

FOREIGN PATENT DOCUMENTS

| CN | 106992810 A | * | 7/2017 |
| CN | 106992810 A | | 7/2017 |

(Continued)

*Primary Examiner* — David W Lambert
(74) *Attorney, Agent, or Firm* — SZDC Law P.C.

(57) ABSTRACT

The present invention provides a protection method and system in flexible bandwidth optical networks with multi-core fiber. The method includes steps of: selecting an appropriate working path for a connection request, and selecting a working core as a transmission channel on the working path; allocating, on the selected working path and working core, a spectrum resource that satisfies spectral continuity, spectral consistency, and a crosstalk threshold constraint; selecting, for the connection request, a dedicated protection path that does not intersect a link of the working path, and selecting a protection core as a transmission channel on the protection path; and finally, allocating, on the selected protection path and protection core, the spectrum resource that satisfies the spectral continuity, the spectral consistency, and the crosstalk threshold constraint.

2 Claims, 4 Drawing Sheets

(56) References Cited

U.S. PATENT DOCUMENTS

2014/0233956 A1* 8/2014 Zami .................. H04J 14/0257
398/79
2017/0019167 A1* 1/2017 Shoji ................. H04B 10/6164

FOREIGN PATENT DOCUMENTS

| CN | 108834004 A | 11/2018 |
| CN | 110234128 A | 9/2019 |
| CN | 110769335 A | 2/2020 |

\* cited by examiner

PROTECTION METHOD AND SYSTEM IN FLEXIBLE BANDWIDTH OPTICAL NETWORKS WITH MULTI-CORE FIBER

This application is the National Stage Application of PCT/CN2020/103927, filed on Jul. 24, 2020, which claims priority to Chinese Patent Application No. 201911070780.6, filed on Nov. 5, 2019, which is incorporated by reference for all purposes as if fully set forth herein.

FIELD OF THE INVENTION

The present invention relates to a dedicated protection method and system in network a flexible bandwidth optical network with multi-core fiber.

DESCRIPTION OF THE RELATED ART

With the fast development of different applications such as data centers, cloud computing, edge computing, and artificial intelligence, Internet applications and data traffic are growing exponentially. This will break the physical limitation of transmission capacity of wavelength-division multiplexing-based single-mode single-core fiber-optical networks. To increase the capacity of fiber-optical networks and achieve a higher transmission network throughput capacity, research has been carried out home and abroad on adding the dimension of space-division multiplexing. Therefore, a flexible bandwidth optical network with multi-core fiber is a highly promising optical network that significantly increases optical network capacity. However, if a single link fails to interrupt a connection request, data loss may cause a huge economic loss. Therefore, a reliable protection mechanism needs to be introduced into flexible bandwidth optical networks with multi-core fiber.

In a conventional single-core flexible bandwidth optical network, when dedicated protection spectrum resources are insufficient in the optical network, a bandwidth compression protection method is used. Specific method steps are as follows:

1) Calculation of a working path and spectrum allocation on the working path. For each connection request, a shortest path algorithm or a K-shortest path algorithm is usually used to calculate a working path from a source node to a destination node. According to a bandwidth requirement of the connection request, in a selected working path, the first-hit method or random selection method is used to search for a spectrum resource that satisfies spectral continuity and spectral consistency. An allocated spectrum resource has a size equal to that of a bandwidth requirement of the connection request. A crosstalk problem between adjacent cores is not considered in the process of allocating a spectrum resource.

2) Calculation of a dedicated protection path and spectrum allocation on the dedicated protection path. For each connection request, a dedicated protection path that does not intersect a link of the working path is calculated. On the dedicated protection path, if there are sufficient spectrum resources for reserving network resources for a connection request, a reserved spectrum resource has a size equal to that of bandwidth requirements of a connection request. Otherwise, different line rates and modulation formats may be used to carry bandwidth requirements of a connection request. In such a case of insufficient dedicated protection spectrum resources, a line rate and a modulation format of the connection request are adjusted as much as possible, and bandwidth resource compression is used to search for and reserve a spectrum resource that satisfies a requirement of the connection request. A crosstalk problem between adjacent cores is also not considered in the process of reserving a dedicated protection spectrum resource.

The foregoing steps can be used in combination with the bandwidth compression protection method in a conventional single-core flexible bandwidth optical network to allocate spectrum resources on a working path and a dedicated protection path for a connection request, and it is not necessary to consider a crosstalk problem. In the flexible bandwidth optical networks with multi-core fiber, there may be crosstalk at a common frequency of adjacent cores. It is necessary to consider both a crosstalk problem in spectrum resource allocation for the working path and a crosstalk problem in spectrum resource allocation for the dedicated protection path.

Generally, in a flexible bandwidth optical network with multi-core fiber, it is usually only necessary to consider a crosstalk-aware network resource allocation method on a working path. However, on a dedicated protection path, a very few of people perform research on related protection resource reservation methods.

SUMMARY OF THE INVENTION

The present invention provides a dedicated protection method and system that can balance the survivability and spectrum utilization in a flexible bandwidth optical network with multi-core fiber To solve the above technical problem, the present invention provides a dedicated protection method in a flexible bandwidth optical network with multi-core fiber, including:

S1. generating a group of connection requests CRs (s, d, FS);

S2. for each connection request in the group of connection requests CRs (s, d, FS), calculating a working path from a source node s to a destination node d and K protection paths that do not intersect a link of the working path;

S3. setting a maximum crosstalk threshold $A_{max}$ of an optical fiber link according to a modulation format of a connection request, searching an optical fiber link $l_w \in p_i$ for a candidate spectrum block that satisfies spectral continuity and spectral consistency, where $S^{c_w l_w} = \{S_{f_0}^{c_w l_w}, S_{f_1}^{c_w l_w}, \ldots, S_{f_j}^{c_w l_w}, \ldots\}$, and calculating a crosstalk value $A_{f_j}^{c_w l_w}$; and searching for a candidate spectrum block with a crosstalk value less than or equal to the set crosstalk threshold $A_{max}$, where if a candidate spectrum block that satisfies a crosstalk threshold constraint is found, this working candidate spectrum block $S_{f_j}^{c_w l_w}$ is recorded, and S4 is performed, or if a candidate spectrum block that satisfies a crosstalk threshold constraint is not found, the connection request is blocked;

S4. setting the maximum crosstalk threshold $A_{max}$ of the optical fiber link according to the modulation format of the connection request, and searching an optical fiber link $l_p \in q_i$ for a candidate spectrum block $S^{c_p l_p} = \{S_{f_0}^{c_p l_p}, S_{f_1}^{c_p l_p}, \ldots, S_{f_j}^{c_p l_p}, \ldots\}$ that satisfies the spectral continuity and the spectral consistency and has a bandwidth equal to a bandwidth requirement of the connection request, where if the candidate spectrum block $S^{c_p l_p}$ is empty, S5 is performed, or if the candidate spectrum block $S^{c_p l_p}$ is not empty, a crosstalk value $A_{f_j}^{c_p l_p}$ is calculated, and starting from an $f_0^{th}$ candidate spectrum block in $S^{c_p l_p}$ to search for a candidate spectrum block that satisfies a crosstalk threshold requirement, where if a candidate spectrum block that satisfies the crosstalk threshold requirement is found, this protection candidate spectrum block $S_{f_i}^{c_p l_p}$ is recorded, and the connection request is successfully established, or if a candidate spectrum block that satisfies the crosstalk threshold requirement is not found, S5 is performed;

S5. compressing the transmission bandwidths of a connection request on a protection path $q_i$ and a protection core $c_p$, and performing S4 after a compressed state of bandwidth is reached, where if a spectrum resource that satisfies the spectral continuity, the spectral consistency, and the crosstalk threshold constraint fails to be found, the connection request is blocked; and S6. establishing a group of connection requests based on S1 to S5.

Preferably, S1 includes: initializing a flexible bandwidth optical network with multi-core fiber G(L,N,C,F), generating a group of connection requests CRs (s, d, FS), setting the maximum crosstalk threshold $A_{max}$ of the optical fiber link in different modulation formats, and setting a maximum modulation order threshold $M_{max}$.

Preferably, a K-shortest path method is used in S2 to calculate the working path from the source node s to the destination node d and the K protection paths that do not intersect the link of the working path.

Preferably, First Formula (1) is used in S3 to calculate a crosstalk impact value $M_{f_{ij}}^{cl}$ of a spectral gap numbered j in an $i^{th}$ candidate spectrum block on a core c of an optical fiber link l by an adjacent core, and the expression of First Formula (1) is:

$$M_{f_{i,j}}^{cl} = \begin{cases} \tau_1 \times \sum_{r \in n} F_j^{rl}, \text{ if } \sum_{r \in n} F_j^{rl} > 1, j \in FM_i \\ \tau_0 \times \sum_{r \in n} F_j^{rl}, \text{ if } \sum_{r \in n} F_j^{rl} \le 1, j \in FM_i \end{cases} \quad (1)$$

where $\tau_0$ and $\tau_1$ are crosstalk weight value adjustment factors, $\tau_0 \in [0,1]$, and $\tau_1 \in [2,3]$;

Second Formula (2) is used in S3 to calculate an optical fiber link crosstalk value $A_{f_i}^{cl}(dB)$ corresponding to the $i^{th}$ candidate spectrum block on the core c of the optical fiber link l, and the expression of Second Formula (2) is:

$$A_{f_i}^{cl}(dB) = 101g\left\{\frac{n - n \cdot \exp[-(n+1) \cdot 2hL]}{1 + n \cdot \exp[-(n+1) \cdot 2hL]}\right\} \times \frac{FS}{FS + \sum_{j \in FM_i} M_{f_{i,j}}^{cl}} \quad (2)$$

where $h = \frac{2K^2 r}{\beta \omega_{th}}$, h is an average increase in crosstalk in each unit of length, n is a quantity of adjacent cores, L is the length of optical fiber, and $\kappa$, r, $\beta$, and $\omega_{th}$ are all physical parameters of the optical fiber, and respectively represent a coupling coefficient, a radius of curvature, a propagation constant, and a centre-to-centre distance;

$M_{f_{ij}}^{cl}$ is the crosstalk impact value of the spectral gap numbered j in the $i^{th}$ candidate spectrum block on the core c of the optical fiber link l by an adjacent core; and $\Sigma_{j \in FM_i} M_{f_{ij}}^{cl}$ is a crosstalk impact value of the $i^{th}$ candidate spectrum block on the core c of the optical fiber link l by an adjacent core; and when the value of $A_{f_i}^{cl}(dB)$ is larger, it indicates that a spectrum block calculated on the core c of the optical fiber link l is susceptible to higher impact from crosstalk.

Preferably, compressing the transmission bandwidths of a connection request in S5 includes:

keeping a modulation order unchanged, and reducing a line rate, where the adjusted line rate needs to be greater than or equal to the data rate of a connection request; or keeping a line rate unchanged, and increasing a modulation order, where the adjusted modulation order needs to be less than or equal to a maximum modulation order threshold $M_{max}$; or adjusting both a line rate and a modulation order, where the adjusted line rate needs to be greater than or equal to the data rate of a connection request, and the adjusted modulation order needs to be less than or equal to a maximum modulation order.

To solve the technical problem of the present invention, the present invention further provides a dedicated protection system in a flexible bandwidth optical network with multi-core fiber, including:

a network initialization module, configured to generate a group of connection requests CRs (s, d, FS);

a threshold setting module, configured to: set a maximum crosstalk threshold $A_{max}$ of an optical fiber link in different modulation formats, and set a maximum modulation order threshold $M_{max}$;

a connection request generation module, configured to generate a connection request according to uniform distribution of source nodes and destination nodes, and set a quantity of connection requests, source nodes and destination nodes of different connection requests, a bandwidth requirement, a line rate, and a modulation format;

a path calculation module, configured to calculate, according to source node s and destination node d of the connection requests CRs (s, d, FS), K candidate working paths and K corresponding candidate protection paths from the source nodes to the destination nodes, to find optimal paths as a working path and a protection path, where the working path and a link of the protection path do not intersect;

a core selection module, configured to: number cores, and when the connection request arrives, sequentially traverse cores, until a spectrum resource that satisfies a requirement is found;

a crosstalk evaluation module, configured to search a specified core for all available spectrum blocks that satisfy double constraint conditions of spectral continuity and spectral consistency, and calculate a crosstalk value $A_{f_i}^{cl}$, for a candidate spectrum resource, and further configured to record a candidate spectrum block $S_{f_i}^{cl}$ when a candidate spectrum block that satisfies a crosstalk threshold requirement is found;

a bandwidth compression control module, configured to adjust the line rate and the modulation format of the connection request when a crosstalk value corresponding to every candidate spectrum block that is reserved on the protection path and a protection core and has a size equal to that of a bandwidth requirement of the connection request is greater than the crosstalk threshold or a spectrum resource that has a size equal to that of a bandwidth requirement of the connection request and satisfies the spectral continuity and the spectral consistency fails to be found; and a spectrum resource allocation module, configured to search the selected working path and protection path for a spectrum block that satisfies the spectral continuity and the spectral consistency and satisfies the crosstalk threshold requirement, and allocate the spectrum resource to the connection request after an available spectrum block is found.

The dedicated protection method and system in a flexible bandwidth optical network with multi-core fiber of the present invention has the following advantages:

First, a crosstalk-aware method is used to inhibit a crosstalk level in a flexible bandwidth optical network with multi-core fiber, to ensure transmission quality for a connection request. Next, a bandwidth compression method is introduced into the dedicated protection method to carry the transmission bandwidths on a protection path and a protection core by using fewer bandwidth resources, so that a connection can be restored as much as possible when a failure occurs, thereby further reducing the blocking probability, and improving network resource utilization. When a crosstalk value corresponding to every candidate spectrum block that is on the protection path and the protection core and has a size equal to that of a bandwidth requirement of the connection request is greater than a crosstalk threshold, or a spectrum resource that has a size equal to that of a bandwidth requirement of the connection request and satisfies spectral continuity and spectral consistency fails to be found, a bandwidth compression control module is triggered, to ensure the transmission quality of optical signals, reduce a bandwidth required for the transmission of connection request, and provide reliable protection for the connection request as much as possible.

DETAILED DESCRIPTION OF THE PREFERRED EMBODIMENTS

Figure 1:
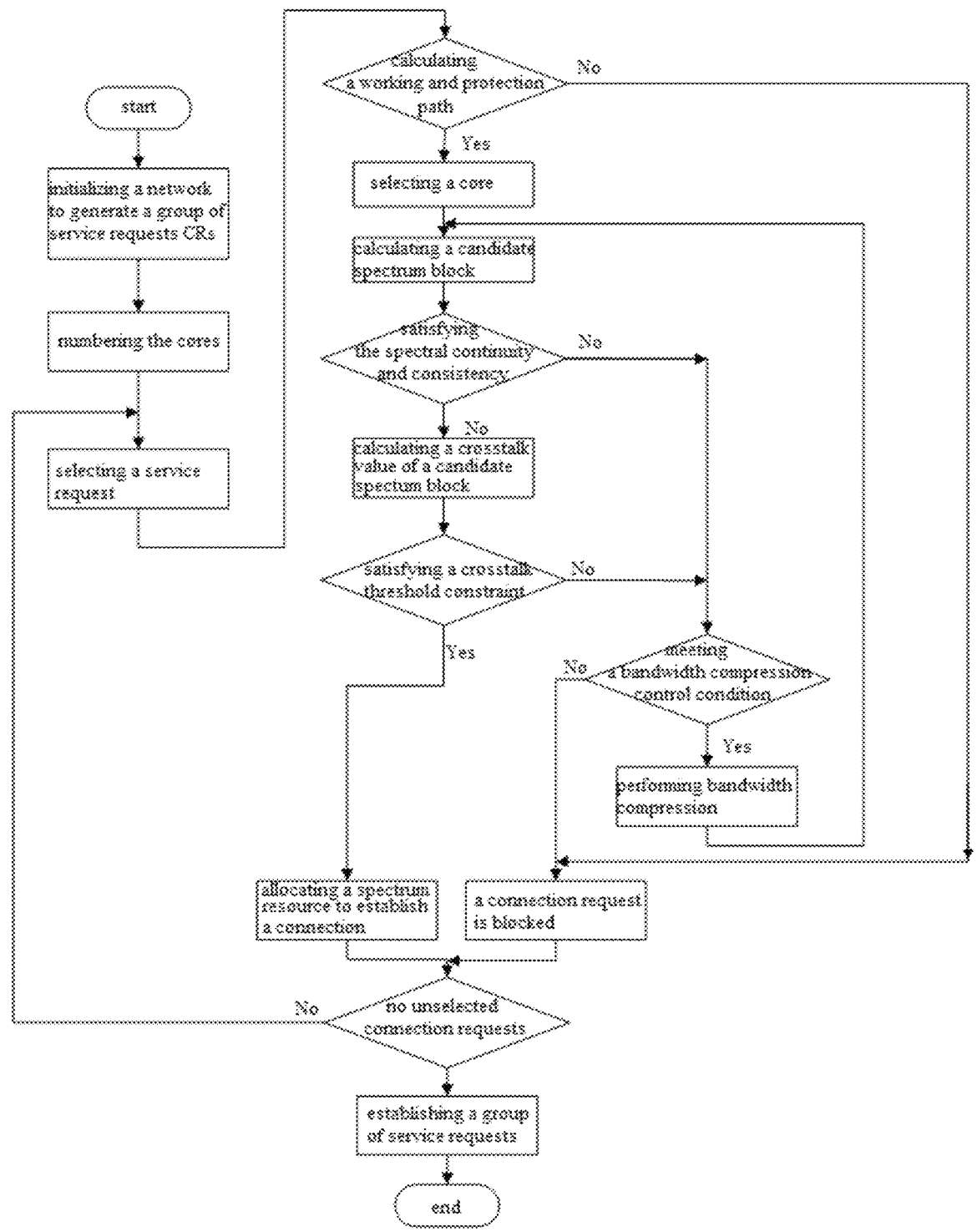
FIG. 1 is a flow chart of a dedicated protection method in a flexible bandwidth optical network with multi-core fiber.
Figure 2:
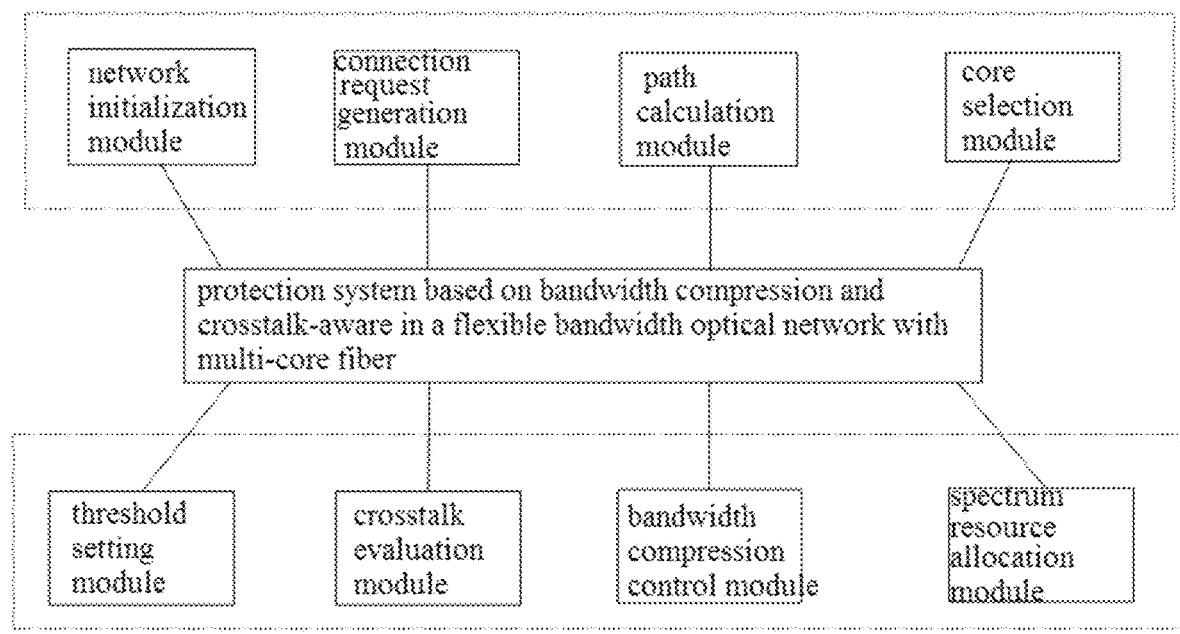
FIG. 2 is a block diagram of a dedicated protection system in a flexible bandwidth optical network with multi-core fiber.

To enable a person skilled in the art to better understand the technical solutions of the present invention, the present invention is further described below in more detail with reference to the accompanying drawings and specific embodiments.

The present invention is further described below in detail with reference to the accompanying drawings. In various accompanying drawings, the same elements are represented by using similar reference numerals. For clarity, various parts are not drawn to scale in the accompanying drawings. In addition, some commonly known parts may be not shown in the drawings.

Many specific details such as the structures, materials, sizes, and treatment process and technologies of members of the present invention are described below to make the present invention more comprehensible. However, as can be seen by a person skilled in the art, the present invention may be not implemented according to these specific details.

In a dedicated protection method in a flexible bandwidth optical network with multi-core fiber in the present invention, the process of establishing a connection request includes: first, selecting an appropriate working path for a connection request, and selecting a working core as a transmission channel on the working path; next, allocating, on the selected working path and working core, a spectrum resource that satisfies spectral continuity, spectral consistency, and a crosstalk threshold constraint; then, selecting, for a connection request, a dedicated protection path that does not intersect a link of the working path, and selecting a protection core as a transmission channel on the protection path; and finally, allocating, on the selected protection path and protection core, the spectrum resource that satisfies the spectral continuity, the spectral consistency, and the crosstalk threshold constraint.

There are the following two cases for a bandwidth size of a reserved spectrum resource: 1) the bandwidth size is equal to the size of a bandwidth requirement of the connection request, and this case is referred to as a normal protection state; and 2) the bandwidth size is less than a size of the bandwidth requirements of a connection request, and this case is referred to as a bandwidth compression protection state. A condition for the normal protection state to occur is that a spectrum resource that has a size equal to that of a bandwidth requirement of a connection request and satisfies the spectral continuity, the spectral consistency, and the crosstalk threshold constraint can be found on the protection path and the protection core. A condition for the bandwidth compression protection state to occur is that a crosstalk value corresponding to every candidate spectrum block that is on the protection path and the protection core and is equal to the bandwidth requirements of a connection request in size is greater than a crosstalk threshold, or a spectrum resource that has a size equal to that of the bandwidth requirements of the connection request and satisfies the spectral continuity and the spectral consistency fails to be found. A manner of implementing the bandwidth compression protection state is adjusting a line rate and a modulation format of the connection request, to ensure that under the premise that the transmission quality of optical signals is satisfied, reliable protection is provided for the transmission of each connection request by using fewer spectrum resources, and the spectrum resource that satisfies the conditions of the spectral continuity, the spectral consistency, and the crosstalk threshold constraint is reserved again for the connection request on the protection path and a protection core.

Embodiment 1

As shown in FIG. 1 to FIG. 5, this embodiment provides a dedicated protection method in a flexible bandwidth optical network with multi-core fiber, the method includes the following steps.

Step 1. Generating a group of connection requests CRs (s, d, FS).

In the step, a flexible bandwidth optical network with multi-core fiber G(L,N,C,F) is initialized, the group of connection requests CRs (s, d, FS) is generated, a maximum crosstalk threshold $A_{max}$ of an optical fiber link in different modulation formats is set, and a maximum modulation order threshold $M_{max}$ is set.

Step 2. For each connection request in a group of connection requests CRs (s, d, FS), calculating a working path from a source node s to a destination node d and K protection paths that do not intersect a link of the working path.

In the step, a K-shortest path method is used to calculate the working path from the source node s to the destination node d and the K protection paths that do not intersect the link of the working path.

Figure 3:
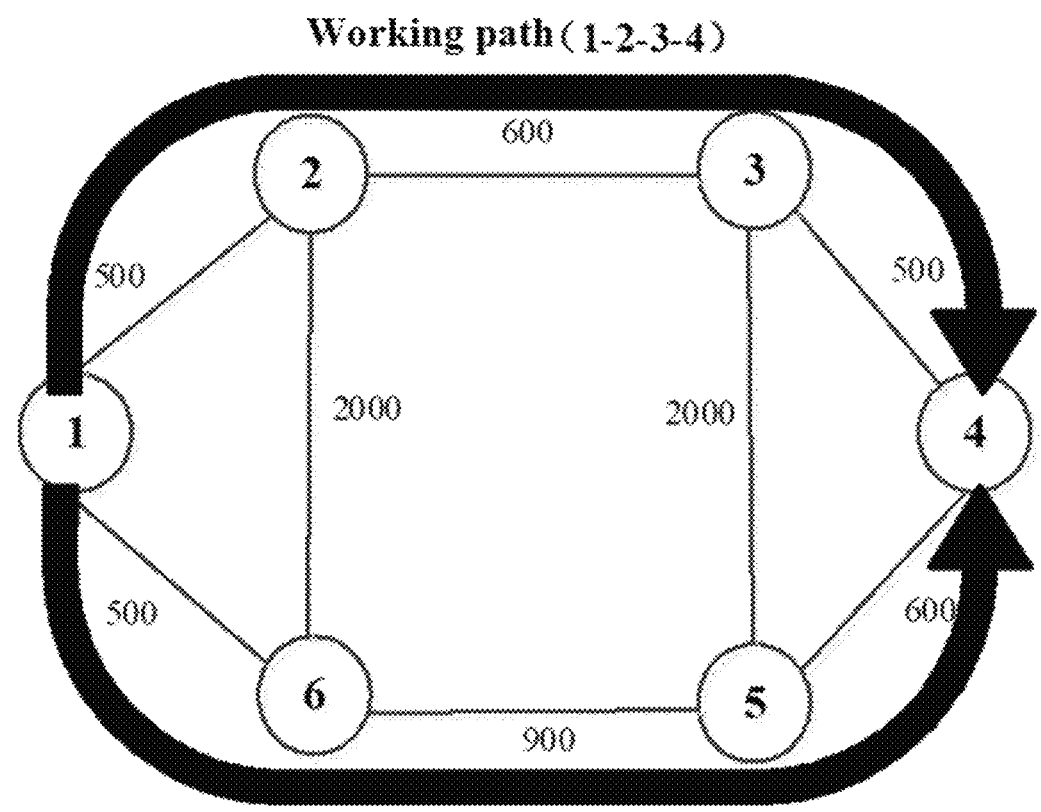
FIG. 3 shows a flexible bandwidth optical network with multi-core fiber (a distance unit in an optical fiber link is km)
Figure 4:
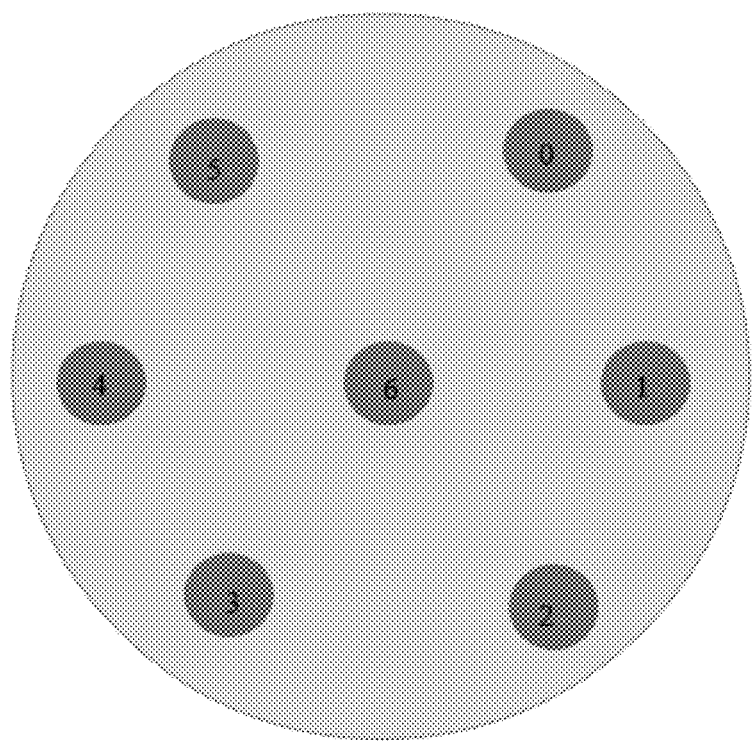
FIG. 4 is a schematic diagram showing core numbers of a seven-core optical fiber.

In the step, first, the flexible bandwidth optical network with multi-core fiber $G_s=(L, N, C, F)$ is initialized. Next, a group of connection requests CRs (s, d, FS) are generated, including source nodes, destination nodes, and a bandwidth requirement size. Third, a working path and a protection path are calculated for each connection request, and cores are sequentially selected. Fourth, the working path and the protection path of the connection request are searched for a spectrum resource, and the spectrum resource is allocated. The connection request is established in a flexible bandwidth optical network with multi-core fiber. Spectral continuity, spectral consistency, and a crosstalk threshold constraint need to be considered in the process. In a case that spectrum resources on the protection path are insufficient or there is no resource that satisfies the crosstalk threshold constraint on the protection path, a bandwidth compression control module is triggered, and the transmission bandwidths of a connection request is carried by reducing spectrum resources occupied. Fifth, according to a state of a spectrum resource occupied by each optical fiber link, spectrum utilization and blocking probability are calculated. A specific embodiment is as follows:

FIG. 3 represents a flexible bandwidth optical network having six nodes and eight optical fiber links. Each optical fiber link is bidirectional. A value on the optical fiber link represents a transmission distance (unit: kilometers (km)). Each optical fiber link includes seven cores, as shown in FIG. 4. A quantity of spectral gaps of each core is 10. Each spectral gap is 12.5 GHz. It is set, according to a modulation format of the connection request, that the maximum crosstalk threshold of each optical fiber link is $A_{max}$(dB). A specific correspondence relationship is shown in table 1. The maximum modulation order is set to $M_{max}=4$. It is set that the structural parameters $\kappa$, $r$, $\beta$, and $\omega_{th}$ of the optical fiber are respectively $3.16\times10^{-5}$, 55 mm, $4\times10^6$, and 45 μm. It is calculated that an average increase in crosstalk in each unit of length is $h=6.1\times10^{-13}$. A total quantity of cores in an optical fiber is N=7. In Formula (1), it is set that $\tau_0=0.5$ and $\tau_1=2.5$.

TABLE 1

Correspondence table among a line rate, a modulation format, and a channel width

| Line rate [Gb/s] | Modulation format | Modulation order [b/symbol] | Channel width[GHz] | Crosstalk threshold [dB] | Relative cost |
|---|---|---|---|---|---|
| 40 | DP-BPSK | 1 | 50.0 | −16 | 1.0 |
| 40 | DP-QPSK | 2 | 25.0 | −18 | 1.2 |
| 100 | DP-QPSK | 2 | 50.0 | −18 | 2.0 |
| 400 | DP-16-QAM | 4 | 75.0 | −24 | 7.2 |

Three connection requests CR1 (1, 4, 4), CR2 (1, 4, 6), and CR3 (1, 4, 2) are generated. The connection requests are all from a source node 1 to a destination node 4, and bandwidth requirements of the connection requests are respectively four spectral gaps, six spectral gaps, and two spectral gaps.

For the first connection request CR1 (1, 4, 4), a data rate is 30 Gb/s, a quantity of required spectral gaps is 4, a corresponding channel width is 50 GHz, a line rate is 100 Gb/s, a modulation format is DP-QPSK, a corresponding crosstalk threshold is $A_{max}=-18$ dB, and in K shortest paths, K=2. Two shortest working paths are calculated from the source node 1 to the destination node 4. The first working path is 1-2-3-4 (1600 km), and the second working path is 1-6-5-4 (2000 km). The first working path is first selected to inspect resources. A shortest dedicated protection path corresponding to a working path 1 is 1-6-5-4 (2000 km), and the path does not intersect the link of the working path 1.

Step 3. Setting a maximum crosstalk threshold $A_{max}$ of an optical fiber link according to a modulation format of the connection request, searching an optical fiber link $l_w \in p_i$ for a candidate spectrum block that satisfies spectral continuity and spectral consistency, where $S^{c_w l_w} = \{S_{f_0}^{c_w l_w}, S_{f_1}^{c_w l_w}, \ldots, S_{f_i}^{c_w l_w}, \ldots\}$, and calculating a crosstalk value $A_{f_i}^{c_w l_w}$; and searching for a candidate spectrum block with a crosstalk value less than or equal to the set crosstalk threshold $A_{max}$, where if a candidate spectrum block that satisfies a crosstalk threshold constraint is found, this working candidate spectrum block $S_{f_i}^{c_w l_w}$ is recorded, and Step 4 is performed, or if a candidate spectrum block that satisfies a crosstalk threshold constraint is not found, the connection request is blocked.

In the step, the first-hit method is used in combination to search for a candidate spectrum block with a crosstalk value less than or equal to the set crosstalk threshold $A_{max}$, that is, $A_{f_i}^{c_w l_w} \leq A_{max}$.

In the embodiment, $S_{f_i}^{c_w l_w} = \{F_{f_i}^{c_w l_w}, F_{f_i+1}^{c_w l_w}, F_{f_i+2}^{c_w l_w}, \ldots, F_j^{c_w l_w}, \ldots, F_{f_i+FS-1}^{c_w l_w}\}$ represents a set of spectral gaps on an $i^{th}$ candidate spectrum block of a core $c_w$ of an optical fiber link $l_w$, $f_i$ is the number of the first spectral gap of the $i^{th}$ candidate spectrum block, and $f_i+FS-1 < |F|-1$, where $j \in FM_i$. $FM_i = \{f_i, f_i+1, f_i+2, \ldots, f_i+FS-1\}$ is a set of numbers of spectral gaps on the $i^{th}$ candidate spectrum block. $F_j^{c_w l_w}$ represents an occupation state of a spectral gap numbered j on the core $c_w$ of the optical fiber link $l_w$. If $F_j^{c_w l_w}=1$, it represents that the spectral gap is occupied. If $F_j^{c_w l_w}=0$, it represents that the spectral gap is idle.

To calculate a crosstalk value, First Formula (1) is used to calculate a crosstalk impact value $M_{f_{ij}}^{cl}$ of the spectral gap numbered j in the $i^{th}$ candidate spectrum block on a core c of an optical fiber link l by an adjacent core. Second Formula (2) is used to calculate an optical fiber link crosstalk value $A_{f_i}^{cl}$(dB) corresponding to the $i^{th}$ candidate spectrum block on the core c of the optical fiber link l.

$$M_{f_{i,j}}^{cl} = \begin{cases} \tau_1 \times \sum_{r \in n} F_j^{rl}, & \text{if } \sum_{r \in n} F_j^{rl} > 1, j \in FM_i \\ \tau_0 \times \sum_{r \in n} F_j^{rl}, & \text{if } \sum_{r \in n} F_j^{rl} \leq 1, j \in FM_i \end{cases} \quad (1)$$

where $\tau_0$ and $\tau_1$ are crosstalk weight value adjustment factors, $\tau_0 \in [0,1]$, and $\tau_1 \in [2,3]$;

$$A_{f_i}^{cl}(\text{dB}) = \qquad (2)$$

$$10\lg\left\{\frac{n - n \cdot \exp[-(n+1) \cdot 2hL]}{1 + n \cdot \exp[-(n+1) \cdot 2hL]}\right\} \times \frac{FS}{FS + \sum_{j \in FM_i} M_{f_{i,j}}^{cl}}$$

where $h = \dfrac{2\kappa^2 r}{\beta \omega_{th}}$, h is an average increase in crosstalk in each unit of length, n is a quantity of adjacent cores, L is the length of optical fiber, and $\kappa$, $r$, $\beta$, and $\omega_{th}$ are all physical parameters of the optical fiber, and respectively represent a coupling coefficient, a radius of curvature, a propagation constant, and a centre-to-centre distance. $M_{f_{ij}}^{cl}$ is the crosstalk impact value of the spectral gap numbered j in the $i^{th}$ candidate spectrum block on the core c of the optical fiber link l by an adjacent core. $\Sigma_{j\in FM_i}M_{fj}^{cl}$ is a crosstalk impact value of the $i^{th}$ candidate spectrum block on the core c of the optical fiber link l by an adjacent core. When the value of $A_{f_i}^{cl}(dB)$ is larger, it indicates that a spectrum block calculated on the core c of the optical fiber link l is susceptible to higher impact from crosstalk.

Step 4. Setting the maximum crosstalk threshold $A_{max}$ of the optical fiber link according to the modulation format of the connection request, and searching an optical fiber link $l_p\in q_i$ for a candidate spectrum block $S^{c_p l_p}=\{S_{f_0}^{c_p l_p}, S_{f_1}^{c_p l_p}, \ldots, S_{f_i}^{c_p l_p}, \ldots\}$ that satisfies the spectral continuity and the spectral consistency and has a bandwidth equal to a bandwidth requirement of the connection request, where if the candidate spectrum block $S^{c_p l_p}$ is empty, Step 5 is performed, or if the candidate spectrum block $S^{c_p l_p}$ is not empty, a crosstalk value $A_{f_i}^{c_p l_p}$ is calculated, where First Formula (1) and Second Formula (2) are used to calculate a crosstalk value $A_{f_i}^{c_p l_p}$, starting from an $f_0^{th}$ candidate spectrum block in $S^{c_p l_p}$ to search for a candidate spectrum block that satisfies a crosstalk threshold requirement, where if a candidate spectrum block that satisfies the crosstalk threshold requirement is found, this protection candidate spectrum block $S_{f_i}^{c_p l_p}$ is recorded, and the connection request is successfully established, or if a candidate spectrum block that satisfies the crosstalk threshold requirement is not found, Step 5 is performed.

In the step, a protection path $q_i$ and a protection core $c_p$ are selected, a crosstalk value is calculated on the protection path $q_i$ and the protection core $c_p$, and a reserved protection spectrum resource is recorded.

Step 5. Compressing a transmission bandwidths on a protection path $q_i$ and a protection core $c_p$, and performing Step 4 after a compressed state of bandwidth is reached, where if a spectrum resource that satisfies the spectral continuity, the spectral consistency, and the crosstalk threshold constraint fails to be found, the connection request is blocked.

Transmission bandwidths of a connection request are compressed on the protection path $q_i$ and the protection core $c_p$. A combination of a modulation format and a line rate of a connection request is adjusted, to implement the transmission bandwidths of a connection request in the compressed state of bandwidth. There are three methods for implementing the transmission bandwidths of a connection request in the compressed state of bandwidth: 1) keeping a modulation order unchanged, and reducing a line rate, where the adjusted line rate needs to be greater than or equal to a the data rate of a connection request; 2) keeping a line rate unchanged, and increasing a modulation order, where the adjusted modulation order needs to be less than or equal to a maximum modulation order threshold $M_{max}$; and 3) adjusting both a line rate and a modulation order, where the adjusted line rate needs to be greater than or equal to the data rate of a connection request, and the adjusted modulation order needs to be less than or equal to a maximum modulation order. In the process of bandwidth compression, in consideration of the cost, the first bandwidth compression method is preferentially selected, the second bandwidth compression method is selected next, and the third bandwidth compression method is finally selected. After the compressed state of bandwidth is reached, Step 4 is performed again. If the spectrum resource that satisfies the spectral continuity, the spectral consistency, and the crosstalk threshold constraint finally fails to be found, the connection request is blocked.

Step 6. Establishing a group of connection requests based on Step 1 to Step 5.

Spectrum resource allocation on a working path for CR1 (1, 4, 4) is specifically described.

Figure 5:
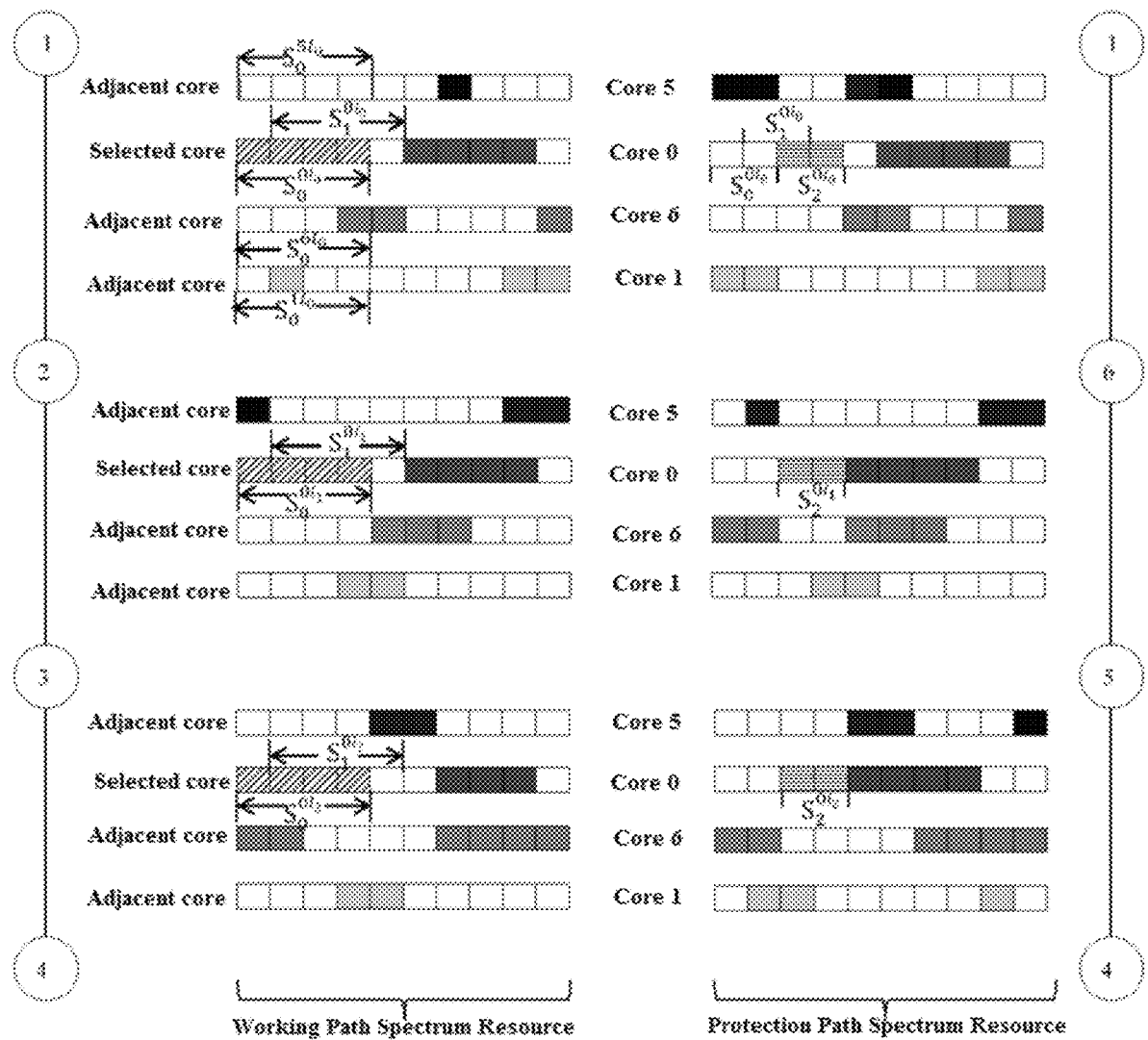
FIG. 5 shows spectrum states of a core 0 and adjacent cores on a working path (1-2-3-4) and a protection path (1-6-5-4).

On the selected working path 1-2-3-4 (1600 km), the minimum spectral gap number to the maximum spectral gap number are first searched on a working core $c_w$=0 to find all spectrum blocks that satisfy constraint conditions of the spectral continuity and the spectral consistency. FIG. 5 shows spectrum states of a core 0 and adjacent cores thereof on the working path (1-2-3-4) and the protection path (1-6-5-4). In FIG. 5, a blank spectral gap represents that the spectral gap is not occupied by a connection request, a black-and-gray spectral gap represents that the spectral gap has been occupied by a connection request, and a spectral gap filled with a pattern represents a resource finally allocated to a connection request CR1 (1, 4, 4). As shown by a spectrum resource of a working path in FIG. 5, a set $S^{0l_0}=\{S_0^{0l_0}, S_1^{0l_0}\}$ of candidate spectrum blocks on a link $l_0$=(1,2) is listed, and a process of calculating a crosstalk value of the first candidate spectrum block $S_0^{0l_0}$ on the link $l_0$=(1, 2) of the core $c_w$=0 is as follows:

The core 0 has three adjacent cores: 1, 5, and 6. Therefore, n=3, and n=\{1, 5, 6\}. In FIG. 5, the first candidate spectrum block $S_0^{0l_0}=\{F_0^{0l}, F_1^{0l}, F_2^{0l}, F_3^{0l}\}$ may be obtained, where $f_0$=0, $FM_0$=\{0,1,2,3\}, FS=4, $\Sigma_{r\in n}F_0^{rl_0}$=0, $\Sigma_{r\in n}F_1^{rl_0}$=1, $\Sigma_{r\in n}F_2^{rl_0}$=0, and $\Sigma_{r\in n}F_3^{rl_0}$=1. Crosstalk impact values $M_{00}^{0l_0}$=0, $M_{01}^{0l_0}=\tau_0\times\Sigma_{r\in n}F_1^{rl_0}$=0.5×1=0.5, and $M_{02}^{0l_0}$=0. $M_{03}^{0l_0}=\tau_0\times\Sigma_{r\in n}F_3^{rl_0}$=0.5×1=0.5 of spectral gaps on the spectrum block by the adjacent cores are respectively calculated according to Formula (1). $\Sigma_{j\in FM_0}M_{0j}^{0l_0}=M_{00}^{0l_0}+M_{01}^{0l_0}+M_{02}^{0l_0}+M_{03}^{0l_0}$=1 is obtained, and the length of optical fiber between the nodes 1 and 2 is L=500 km, h=6.1×10$^{-13}$, and it may be calculated according to Formula (2) that a crosstalk value $A_0^{0l_0}$=−37.8991 dB<$A_{max}$. A crosstalk value of a spectrum block $S_0^{rl_0}$ is less than the crosstalk threshold $A_{max}$, a working spectrum resource $S_0^{0l_0}$ on the pre-allocated link $l_0$=(1,2) is recorded for the request CR1 (1, 4, 4).

A crosstalk value at a spectrum block $S_0^{0l_1}$ is calculated on a link $l_1$=(2, 3). For an optical fiber link $l_1$=(2, 3), the length of optical fiber between the nodes 2 and 3 is L=600 km, h=6.1×10$^{-13}$, and a set of adjacent cores is n=\{1,5,6\}. According to the spectrum state on the working path in FIG. 5 and a step same as that of calculating a crosstalk value on the link $l_0$=(1, 2) is used, and a calculation result is $A_0^{0l_1}$=−37.2656 dB<$A_{max}$. The working spectrum resource $S_0^{0l_1}$ on the pre-allocated link $l_1$=(2, 3) is recorded for the request CR1 (1, 4, 4).

A crosstalk value at a spectrum block $S_0^{0l_2}$ is calculated on a link $l_2$=(3, 4). For an optical fiber link $l_2$=(3, 4), the length of optical fiber between the nodes 3 and 4 is L=500 km. According to the spectrum state in FIG. 5, a step same as that of calculating a crosstalk value on the link $l_0$=(1, 2) may be used to calculate $A_{10}^{0l_2}$=−34.4537 dB<$A_{max}$. Therefore, the candidate spectrum block $S_0^{0l_2}$ satisfies a crosstalk threshold constraint of the optical fiber link. Therefore, the spectrum blocks $S_0^{0l_0}$, $S_0^{0l_1}$, and $S_0^{0l_2}$ on all the links on the path (1-2-3-4) satisfy the crosstalk threshold constraint and may be used as working spectrum resources on the working path.

Spectrum resource allocation on a protection path for CR1 (1, 4, 4):

On the selected dedicated protection path 1-6-5-4 (2000 km), a spectrum block with a spectrum width of four spectral gaps is first found for the connection request CR1 (1, 4, 4).

The minimum spectral gap number to the maximum spectral gap number are first searched on the protection core $c_p=0$, to find all spectrum blocks that satisfy the constraint conditions of the spectral continuity and the spectral consistency. As shown in FIG. 5, a set $S^{0l_0}=\{S_0^{0l_0}\}$ of candidate spectrum blocks on a link $l_0=(1,6)$ is listed. A method same as that for calculating and allocating a spectrum resource on the working path is used to calculate that a crosstalk value corresponding to the spectrum block $S_0^{0l_0}$ is −13.5354 dB, and is greater than the crosstalk threshold $A_{max}=-18$ dB. On the protection core $c_p=0$ of the protection path (1-6-5-4), no available spectrum block satisfies the spectral continuity, the spectral consistency, and the crosstalk threshold constraint. If no available spectrum block that satisfies the crosstalk threshold constraint is found in the remaining cores, a bandwidth compression control module is triggered.

In the bandwidth compression control module, for the connection request CR1 (1, 4, 4), while a modulation order is kept unchanged, a line rate is first reduced to 40 Gb/s, which is greater than a data rate of 30 Gb/s. A quantity of spectral gaps required for a connection request on the protection path is reduced to 2, and a corresponding crosstalk threshold is still $A_{max}=-18$ dB. First, the minimum spectral gap number to the maximum spectral gap number are searched on the protection core $c_p=0$, to find all spectrum blocks that satisfy the constraint conditions of the spectral continuity and the spectral consistency and have a bandwidth of two spectral gaps. As shown by a spectrum resource of the protection path in FIG. 5, a set of $S^{0l_0}=\{S_0^{0l_0}, S_1^{0l_0}, S_2^{0l_0}\}$ of candidate spectrum blocks on the link $l_0=(1,6)$ is listed. A method same as that for allocating the spectrum resource on the working path is used to respectively calculate a crosstalk value corresponding to each candidate spectrum block on links of the protection path. In a spectrum state of the protection path in FIG. 5, crosstalk values corresponding to spectrum blocks $S_2^{0l_0}$, $S_2^{0l_1}$, and $S_2^{0l_2}$ on the core 0 of the protection path are respectively −47.3738 dB, −35.8569 dB, and −37.2656 dB, and are all less than the crosstalk threshold $A_{max}=-18$ dB. Therefore, the spectrum blocks $S_2^{0l_0}$, $S_2^{0l_1}$, and $S_2^{0l_2}$ on all links of the path (1-6-5-4) all satisfy the crosstalk threshold constraint, and may be used as protection spectrum resources on the protection path.

For the connection requests CR2 (1, 4, 6) and CR3 (1, 4, 2), according to the steps of establishing a connection for the connection request CR1 (1, 4, 4), a working route and a protection route are calculated, a core is selected, and a working spectrum resource and a protection spectrum resource are allocated. When a crosstalk value corresponding to every candidate spectrum block that is on the protection path and the protection core and has a size equal to that of a bandwidth requirement of a connection request is greater than the crosstalk threshold, or a spectrum resource that has a size equal to that of a bandwidth requirement of the connection request and satisfies the spectral continuity and the spectral consistency fails to be found, the bandwidth compression control module is triggered. The bandwidth compression control module is used to carry the bandwidth requirements of a connection request on the protection path and the protection core by using fewer bandwidth resources, so that a connection request is protected as much as possible, the blocking probability is reduced, the degree of redundancy of spectrum resources is reduced, and the utilization of spectrum resources is increased.

In this embodiment, in a flexible bandwidth optical network with multi-core fiber, a bandwidth compression method and a crosstalk-aware method are combined, and a condition of triggering a bandwidth compression mechanism is changed, so that a conventional bandwidth compression dedicated protection method is optimized, the blocking probability is reduced, the utilization of spectrum resources is increased, and the degree of redundancy of spectrum resources is reduced.

When a crosstalk value corresponding to every candidate spectrum block that is on the protection path and the protection core and has a size equal to that of a bandwidth requirement of the connection request is greater than the crosstalk threshold, or a spectrum resource that has a size equal to that of a bandwidth requirement of the connection request and satisfies the spectral continuity and the spectral consistency fails to be found, the bandwidth compression control module is triggered, so that under the premise that particular signal quality is ensured, a bandwidth required for a connection request is reduced, and reliable protection is provided for a connection request as much as possible.

Embodiment 2

As shown in FIG. 1 to FIG. 5, this embodiment provides a dedicated protection system in a flexible bandwidth optical network with multi-core fiber, the system includes:

a network initialization module, configured to set, in a flexible bandwidth optical network with multi-core fiber $G_s=(L,N,C,F)$, topology information of this flexible bandwidth optical network with multi-core fiber, an optical fiber connection status, a quantity of network switching nodes, a quantity of optical fiber links, a quantity of cores of each optical fiber, a quantity of spectral gaps of each optical fiber link, and a bandwidth size of each spectral gap;

a threshold setting module, configured to set a maximum crosstalk threshold $A_{max}$ of an optical fiber link in different modulation formats, and set a maximum modulation order threshold $M_{max}$;

a connection request generation module, configured to generate a connection request according to uniform distribution of source nodes and destination nodes, and set information such as a quantity of connection requests, source nodes and destination nodes of different connection requests, a bandwidth requirement, a line rate, and a modulation format;

a path calculation module, configured to calculate, according to source node s and destination node d of each connection request CR (s, d, FS) and by using a K-shortest path algorithm, K candidate working paths and K corresponding candidate protection paths from the source node s to the destination node d, to find optimal paths as a working path and a protection path, where the working path and a link of the protection path do not intersect; and a core selection module, configured to select, for each connection request, an appropriate working core and protection core, where after cores are numbered, when a connection request arrives, a core 0 is first selected, if a spectrum resource that satisfies a requirement can be found on the core 0, the core 0 is selected as the working core or protection core, or otherwise, a core 1 is selected, to search for the spectrum resource that satisfies a requirement, and the rest is deduced by analogy, until all cores are traversed;

a crosstalk evaluation module, configured to: in the selected working path or protection path, first, search a specified core according to a bandwidth requirement of a connection request for all available spectrum blocks that satisfy double constraint conditions of spectral continuity and spectral consistency, where the spectrum blocks are represented by a set $S^{cl}=\{S_{f_0}^{cl}, S_{f_1}^{cl}, \ldots, S_{f_i}^{cl}, \ldots\}$ of candidate spectrum blocks; calculate a crosstalk value $A_{f_i}^{cl}$ for a candidate spectrum resource by using First Formula (1) and Second Formula (2); start from an $f_0^{th}$ candidate spectrum block in $S^{cl}$ to search for a candidate spectrum block that satisfies a crosstalk threshold requirement, that is, a candidate spectrum block whose crosstalk value is less than or equal to the crosstalk threshold $A_{max}$ corresponding to the modulation format, that is, $A_{f_i}^{cl} \leq A_{max}$; if the $f_0^{th}$ candidate spectrum block does not satisfy the crosstalk threshold requirement, continue to search for an $f_1^{th}$ candidate spectrum block, until all candidate spectrum blocks have been searched, where if none is found, this connection request is blocked, or if a candidate spectrum block that satisfies the crosstalk threshold requirement is found, this candidate spectrum block $S_{f_i}^{cl}$ is recorded; and a bandwidth compression control module, configured to: when a crosstalk value corresponding to every candidate spectrum block that is reserved on the protection path and a protection core and has a size equal to that of a bandwidth requirement of the connection request is greater than the crosstalk threshold or a spectrum resource that has a size equal to that of a bandwidth requirement of the connection request and satisfies the spectral continuity and the spectral consistency fails to be found, the bandwidth compression control module is triggered; in the module, adjust the line rate and the modulation format of a connection request, so that under the premise that particular signal transmission quality is ensured, reliable protection is provided for each connection request by using fewer spectrum resources; and a spectrum resource allocation module, configured to search the selected working path and protection path for a spectrum block that satisfies the spectral continuity and the spectral consistency and satisfies the crosstalk threshold requirement, and if an available spectrum block is found, allocate the spectrum resource for the connection request.

It should be noted that, the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, in the context of a process, method, object or device that includes a series of elements, the process, method, object or device not only includes such elements, but also includes other elements not specified expressly, or may include inherent elements of the process, method, object or device. If no more limitations are made, an element limited by "include a/an . . . " does not exclude other same elements existing in the process, method, object or device which includes the element.

As discussed above according to the embodiments of the present invention, all details are not described in detail in these embodiments, and the present invention is not merely limited to the specific embodiments. Apparently, many changes and variations may be made according to the foregoing description. These embodiments are selected and described in detail in the specification for better explanation of the principle and actual application of the present invention, so that a person skilled in the art can adequately make use of the present invention and make changes based on the present invention for use. The present invention is only limited by the claims and the full scope and equivalents thereof.

What is claimed is:

1. A protection method in a flexible bandwidth optical network with multi-core fiber, comprising:
   S1, generating a group of connection requests CRs;
   S2, for each connection request from the group of the connection requests CRs, calculating a working path from a source node s to a destination node d and K protection paths that do not intersect a link of the working path;
   S3, setting a maximum crosstalk threshold $A_{max}$ of an optical fiber link according to a modulation format of a connection request, searching an optical fiber link for a candidate spectrum block that satisfies spectral continuity and spectral consistency, and calculating a crosstalk value; and searching for a candidate spectrum block with a crosstalk value less than or equal to the set crosstalk threshold $A_{max}$, wherein
   if the candidate spectrum block that satisfies a crosstalk threshold constraint is found, the candidate spectrum block is recorded, and S4 is performed, or
   if the candidate spectrum block that satisfies a crosstalk threshold constraint is not found, the connection request is blocked;
   S4, setting the maximum crosstalk threshold $A_{max}$ of the optical fiber link according to the modulation format of a connection request, and searching an optical fiber link for a candidate spectrum block that satisfies the spectral continuity and the spectral consistency and has a bandwidth equal to a bandwidth requirements of a connection request, wherein
   if the candidate spectrum block is empty, S5 is performed, or
   if the candidate spectrum block is not empty, a crosstalk value is calculated, and
   searching for the candidate spectrum block that satisfies a crosstalk threshold requirement, wherein
   if the candidate spectrum block that satisfies the crosstalk threshold requirement is found, the candidate spectrum block is recorded, and the connection request is successfully established, or
   if the candidate spectrum block that satisfies the crosstalk threshold requirement is not found, S5 is performed;
   S5, compressing the transmission bandwidth of a connection request on a protection path $q_i$ and a protection core $c_p$, and performing S4 after a compressed state of bandwidth is reached, wherein if a spectrum resource that satisfies the spectral continuity, the spectral consistency, and the crosstalk threshold constraint fails to be found, the connection request is blocked; and
   S6, establishing a group of connection requests based on S1 to S5,
   wherein First Formula (1) is used in S3 to calculate a crosstalk impact value $M_{f_{ij}}^{cl}$ of a spectral gap numbered j in an $i^{th}$ candidate spectrum block on a core c of an optical fiber link l by an adjacent core, and the expression of First Formula (1) is:

$$M_{f_{i,j}}^{cl} = \begin{cases} \tau_1 \times \sum_{r \in n} F_j^{rl}, \text{if } \sum_{r \in n} F_j^{rl} > 1, j \in FM_i \\ \tau_0 \times \sum_{r \in n} F_j^{rl}, \text{if } \sum_{r \in n} F_j^{rl} \leq 1, j \in FM_i \end{cases} \quad (1)$$

wherein $\tau_0$ and $\tau_1$ are crosstalk weight value adjustment factors, $\tau_0 \in [0,1]$, and $\tau_1 \in [2,3]$;

Second Formula (2) is used in S3 to calculate an optical fiber link crosstalk value $A_{f_i}^{cl}(dB)$ corresponding to the $i^{th}$ candidate spectrum block on the core c of the optical fiber link l, and the expression of Second Formula (2) is:

$$A_{f_i}^{cl}(dB) = 10\lg\left\{\frac{n - n \cdot \exp[-(n+1)\cdot 2hL]}{1 + n \cdot \exp[-(n+1)\cdot 2hL]}\right\} \times \frac{FS}{FS + \sum_{j \in FM_i} M_{f_{i,j}}^{cl}} \quad (2)$$

where $h = \frac{2K^2 r}{\beta \omega_{th}}$, h is an average increase in crosstalk in each unit of length, n is a quantity of adjacent cores, L is the length of optical fiber, and κ, r, β, and $\omega_{th}$ are all physical parameters of the optical fiber, and respectively represent a coupling coefficient, a radius of curvature, a propagation constant, and a centre-to-centre distance;

$M_{f_{ij}}^{cl}$ is the crosstalk impact value of the spectral gap numbered j in the $i^{th}$ candidate spectrum block on the core c of the optical fiber link l by an adjacent core; and $\Sigma_{j \in FM_i} M_{f_{ij}}^{cl}$ is a crosstalk impact value of the $i^{th}$ candidate spectrum block on the core c of the optical fiber link l by an adjacent core; and when the value of $A_{f_i}^{cl}(dB)$ increases, it indicates that a spectrum block calculated on the core c of the optical fiber link l is susceptible to higher impact from crosstalk.

2. The method according to claim 1, wherein compressing the transmission bandwidth of a connection request in S5 comprises:

keeping a modulation order unchanged, and reducing a line rate, wherein an adjusted line rate needs to be greater than or equal to a data rate of a connection request; or keeping a line rate unchanged, and increasing a modulation order, wherein an adjusted modulation order needs to be less than or equal to a maximum modulation order threshold $M_{max}$; or adjusting both a line rate and a modulation order, wherein the adjusted line rate needs to be greater than or equal to a data rate of a connection request, and the adjusted modulation order needs to be less than or equal to a maximum modulation order.

* * * * *